United States Patent [19]
Kambe et al.

[11] Patent Number: 5,818,933
[45] Date of Patent: Oct. 6, 1998

[54] COPYRIGHT CONTROL SYSTEM

[75] Inventors: Hidetoshi Kambe; Atsuhiro Yamagishi; Makoto Saito, all of Tokyo, Japan

[73] Assignee: Mitsubishi Denki Kabushiki Kaisha, Tokyo, Japan

[21] Appl. No.: 674,571

[22] Filed: Jul. 5, 1996

[30] Foreign Application Priority Data

Jul. 7, 1995 [JP] Japan ................................ 7-172310

[51] Int. Cl.⁶ .................................................. H04L 9/00
[52] U.S. Cl. ................................ 380/4; 380/3; 380/25
[58] Field of Search ................................ 380/3, 4, 5, 25

[56] References Cited

U.S. PATENT DOCUMENTS

| | | | |
|---|---|---|---|
| 4,757,534 | 7/1988 | Matyas et al. | 380/25 |
| 5,063,596 | 11/1991 | Dyke | 380/49 |
| 5,237,616 | 8/1993 | Abraham et al. | 380/49 |
| 5,291,554 | 3/1994 | Morales | 380/5 |
| 5,319,705 | 6/1994 | Halter et al. | 380/4 |
| 5,392,351 | 2/1995 | Hasebe et al. | 380/4 |
| 5,400,403 | 3/1995 | Fahn et al. | 380/21 |
| 5,586,186 | 12/1996 | Yuval | 380/30 |
| 5,615,264 | 3/1997 | Kazmierczak et al. | 380/4 |

FOREIGN PATENT DOCUMENTS

| | | |
|---|---|---|
| 0114368A2 | 8/1984 | European Pat. Off. . |
| 0421409 | 10/1990 | European Pat. Off. . |
| 0471538A1 | 2/1992 | European Pat. Off. . |
| 0561685A2 | 9/1993 | European Pat. Off. . |
| 677949 | 3/1995 | European Pat. Off. . |
| 0715241 | 6/1996 | European Pat. Off. . |

*Primary Examiner*—Thomas H. Tarcza
*Assistant Examiner*—Carmen D. White

[57] ABSTRACT

A copyright control system for performing access control to copyright digital information. The copyright control system is equipped with an encryption/decryption hardware 11 which accepts encrypted copyright digital information from an option hardware 6 or an FDD unit 3 through a sub-data bus 23. The encryption/decryption hardware 11 decrypts the encrypted digital information using a decryption key obtained from a copyright control center for primary utilization of the encrypted digital information and inputted from an CPU 1.

16 Claims, 7 Drawing Sheets

COPYRIGHT CONTROL SYSTEM

BACKGROUND OF THE INVENTION

1. Field of the Invention

The present invention relates to a system for controlling or managing the copyrights of digitized information on computers.

2. Description of the Related Art

An arrangement of a general computer is shown in a block diagram of FIG. 8, comprising a central processing unit (CPU) 1, a fixed disk unit (HDD) 2, a floppy disk unit (FDD) 3, a printer 4, an interface 5 for connections to external networks such as an RS-232C port, an option hardware 6 such as a CD-ROM drive, a video signal input unit, a broadcast wave receiver, a scanner and an extended HDD, a ROM 7, a main storage RAM 8, a video RAM 9 for storage of display data to a CRT, and a main data bus 22 for transmission and reception of information between these components.

In operation, copyright (copyright-claimed) digital information, supplied with a recording medium such as a CD-ROM and an FDD, is delivered from a CD-ROM drive serving as the option hardware 6 or from the FDD 3 through the main data bus 22 to the main storage RAM 8 and stored therein. Subsequently, in accordance with a program stored in the main storage RAM 8 or the ROM 7, this information is expanded and converted with the CPU 1 connected through the data bus 22 thereto or with a dedicated expansion and conversion unit coupled to the option hardware 6, before being displayed on a CRT unit (not shown) through the main data bus 22 and the video RAM 9.

However, because the prior general computer has the above-mentioned arrangement, the digital information stored in the main storage RAM 8 is easily reproducible and transmittable through the HDD 2, the FDD 3 or the interface 5 for the connections to the external networks, which is in connection with the main data bus 22, and hence there is a problem in that, irrespective of having intention or no intention, the invasion of the copyright which is an legal right the producer has can easily occur with respect to the copyright digital information supplied with a recording medium such as a CD-ROM and an FDD.

SUMMARY OF THE INVENTION

The present invention has been developed with a view to eliminating the above-mentioned problem, and it is therefore an object of the present invention to provide a copyright control system which can realize the access control to the copyright digital information carried on a recording medium such as a CD-ROM and an FDD and which has a copyright control function to make an encryption in reproducing and sending digital information through an HDD, an FDD or an interface for connections to external networks, which is coupled to a main data bus, and further to provide an encryption/decryption (encoding/decoding) hardware available for the copyright control system.

In accordance with a first aspect of the present invention, there is provided a copyright control system comprising decryption means which accepts encrypted (enciphered) copyright digital information to decrypt (decipher) the encrypted digital information by means of a decryption key obtained from a copyright control center for primary utilization of the encrypted digital information.

In accordance with a second aspect of the present invention, there is provided a copyright control system comprising encryption means which accepts copyright digital information to encrypt the digital information by means of an encryption key obtained from a copyright control center for secondary utilization of the digital information.

In accordance with a third aspect of the present invention, the first-mentioned copyright control system further comprises decryption means which accepts encrypted copyright digital information to decrypt the encrypted digital information by means of a decryption key obtained from a copyright control center for primary utilization of the encrypted digital information.

In accordance with a fourth aspect of the present invention, the copyright control system further comprises first information processing means to implement at least one of display, process and edit of the digital information decrypted by the decryption means.

In accordance with a fifth aspect of the present invention, the copyright control system further comprises a second information processing means to perform at least one of communication, broadcast, storage and copy of the digital information encrypted by the encryption means.

In accordance with a sixth aspect of the present invention, the copyright control system further comprises a central information unit and a main data bus directly connected to the central information unit, the decryption means being coupled to the main data bus.

In accordance with a seventh aspect of the present invention, the copyright control system further comprises an auxiliary memory, a network connection unit and a sub-data bus coupled to the auxiliary memory and the network connection unit, the decryption means being coupled to the sub-data bus.

In accordance with an eighth aspect of the present invention, the copyright control system further comprises a central information processing section and a main data bus directly connected to the central information processing section, the encryption means being coupled to the main data bus.

In accordance with a ninth aspect of the present invention, the copyright control system further comprises an auxiliary memory, a network connection unit and a sub-data bus coupled to the auxiliary memory and the network connection unit, the encryption means being coupled to the sub-data bus.

In accordance with a further aspect of this invention, the decryption means or encryption means is provided in an LSI, an extended board or a PC card.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF PREFERRED EMBODIMENTS

First Embodiment

Figure 1:
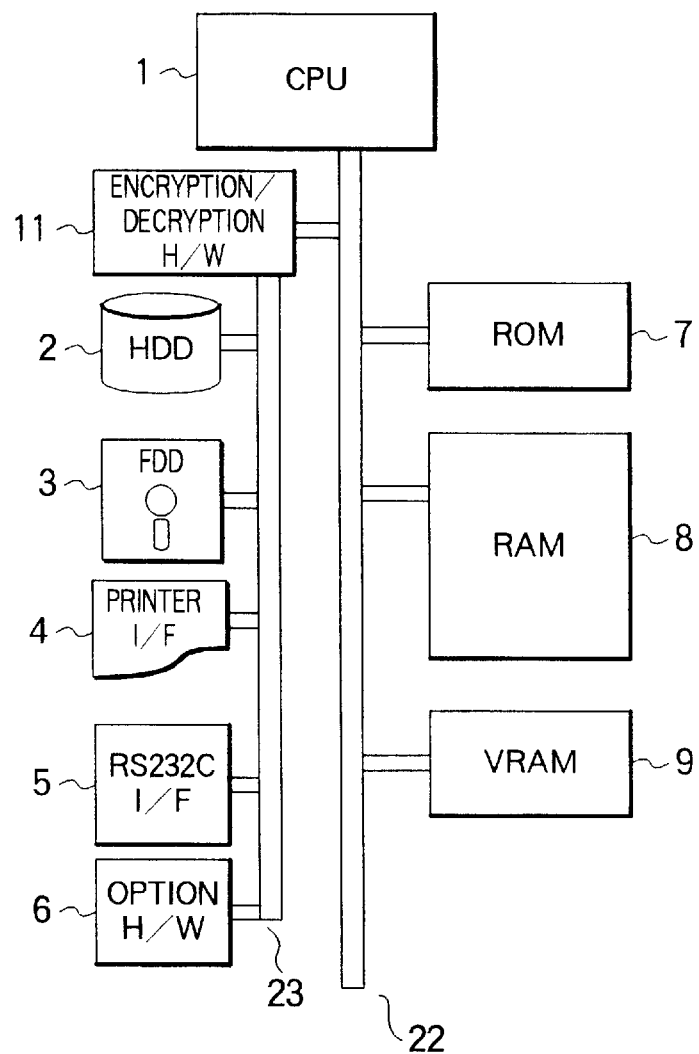
FIG. 1 is a block diagram showing a copyright control system according to a first embodiment of the present invention.

A description will be made hereinbelow of a first embodiment of the present invention with reference to FIG. 1. In FIG. 1, a copyright control system is shown as comprising an encryption/decryption hardware 11 and a sub-data bus 23 coupled to the encryption/decryption hardware 11. The encryption/decryption hardware 11 is also connected to a main data bus 22 so that it is coupled through the main data bus 22 to a CPU 1, a ROM 7, a main storage RAM 8 and a video RAM (VRAM) 9 to transfer and receive data thereto and therefrom.

Secondly, an operation of this first embodiment will be described with reference to FIG. 1.

Copyright digital information is encrypted or enciphered into digital information ED1$i$ and supplied with a recording medium such as a CD-ROM or an FDD or transmitted and supplied from a broadcast wave transmitter.

In this copyright control system according to the first embodiment, the encrypted copyright digital information ED1$i$ is obtainable through a CD-ROM drive serving as one of option hardwares 6, a broadcast wave receiver or an FDD unit 3. The encryption/decryption hardware 11 reads out the obtained encrypted copyright digital information ED1$i$ through the subdata bus 23 from the option hardware 6 or the FGG unit 3 and takes a decryption key K1 from the CPU 1, the decryption key K1 being attained through the FDD unit 3, an interface 5 or the option hardware 6 from a separate copyright control center. Further, the encryption/decryption hardware 11 decrypts the encrypted copyright digital information ED1$i$ using the decryption key K1 and makes the decrypted digital information stored in the main storage RAM 8 through the main data bus 22.

Subsequently, as well as the prior example, in accordance with a program stored in the main storage RAM or the ROM 7 the decrypted digital information is expanded, or developed, and converted with the CPU 1 coupled through the main data bus 22 thereto or with a dedicated expansion and conversion unit connected to the option hardware 6, and then displayed on a CRT unit (not shown) through the main data bus 22 and the video RAM 9.

Furthermore, a description will be made hereinbelow of the case that, after the CPU 1 or the like accepts the decrypted digital information through the main data bus 22 to perform the display, edit and process, the edited and processed copyright digital information is reproduced and delivered through an HDD unit 2, the FDD 3 or the interface 5 for connections to external networks.

The encryption/decryption hardware 11 reads out through the main data bus 22 the display, edited and processed copyright digital information D2$i$ stored in the main storage RAM 8 and enciphers it using an encryption key K2 inputted therein from the CPU 1, thus producing an encrypted digital information ED2$i$. In this case, the encryption key K2 is obtainable from a separate copyright control center through the FDD unit 3, the interface 5 and/or the option hardware 6. Moreover, the encryption/decryption hardware 11 reproduces and transfers the encrypted copyright digital information ED2$i$ through the sub-data bus 23 from the HDD unit 2, the FDD unit 3 or the interface 5 for connections to external networks.

As described above, the copyright digital information is enciphered and supplied, while according to this first embodiment the enciphered copyright digital information can be deciphered using the decryption key K1 obtained from the separate copyright control center.

In addition, the edited and processed copyright digital information can be enciphered using the encryption key K2 obtained from the separate copyright control center, and then reproduced and delivered.

Second Embodiment

Figure 2:
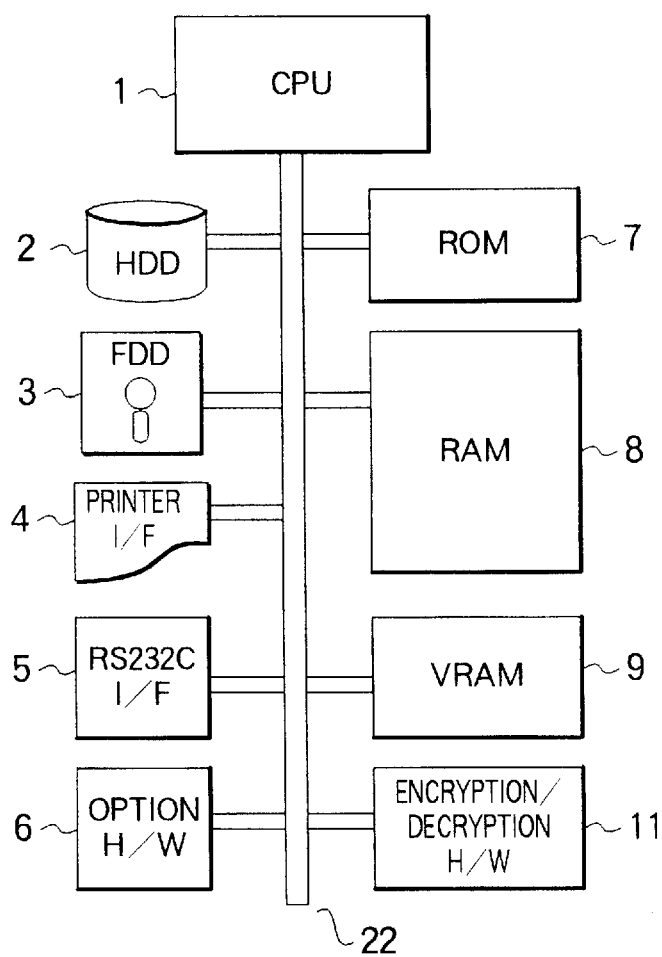
FIG. 2 is a block diagram showing a copyright control system according to a second embodiment of the present invention.

Although the FIG. 1 first embodiment includes the sub-data bus 23, it is also possible to connect the encryption/decryption hardware 11, the HDD unit 2, the FDD unit 3, a printer 4, the interface 5 and the option hardware 6 to the main data bus 22 as shown in FIG. 2.

In the FIG. 2 copyright control system, the encryption/decryption hardware 11 carries out the data input and output from and to the HDD unit 2, the FDD unit 3, the interface 5 and the option hardware 6 through the main data bus 22. In this respect, this embodiment differs from the above-described first embodiment. The operation is the same as that of the first embodiment.

Third Embodiment

Although in the first and second embodiments the decryption processing and encryption processing of the copyright digital information are implemented by the encryption/decryption hardware 11, processing them by a software is also practicable in place of the processes to be done by the encryption/decryption hardware 11.

Figure 3:
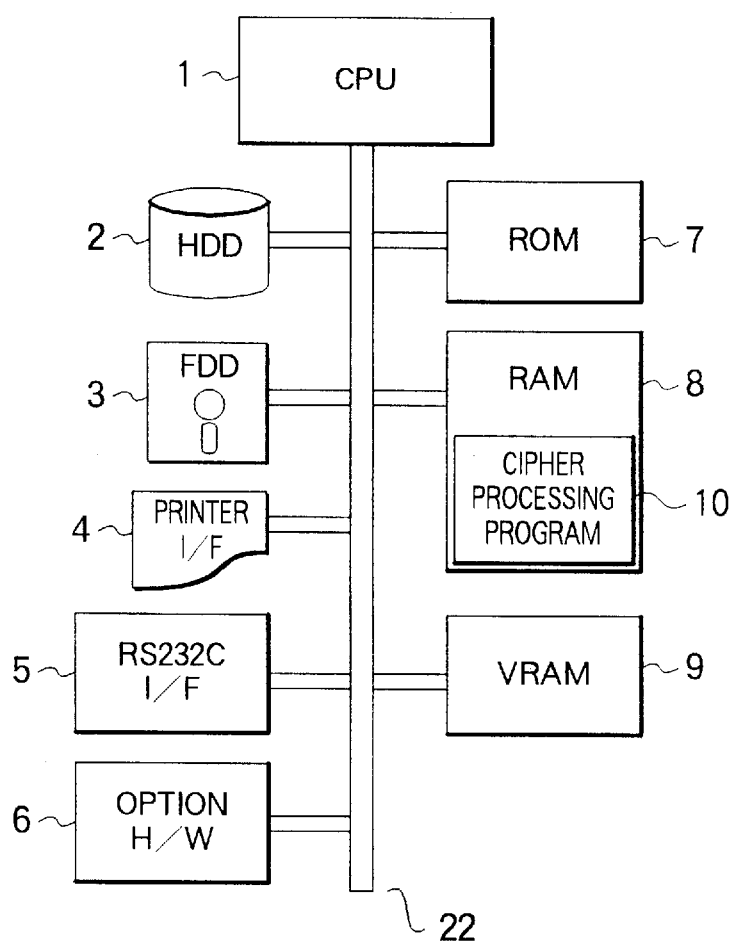
FIG. 3 is a block diagram showing a copyright control system according to a third embodiment of the present invention.

FIG. 3 is an illustration of an arrangement in the case that the processes of the encryption/decryption hardware 11 of FIG. 2 is performed with a software.

In FIG. 3, designated at numeral 10 is an cipher processing program on the main storage RAM 8 which is designed to execute processes similar to those of the encryption/decryption hardware 11 in the first and second embodiments. In addition, the cipher processing program 10 implements the data input and output from and to the HDD unit 2, the FDD unit 3, the interface 5 and the option hardware 6 through the main data bus 22.

Figure 4A:
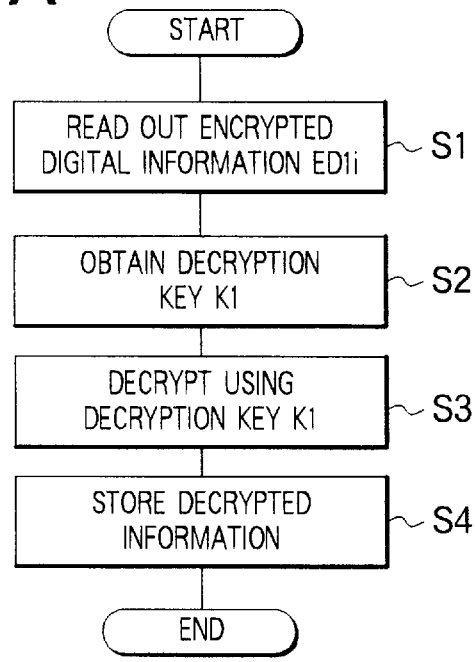
FIGS. 4A and 4B are flow charts available for describing an operation of a cipher processing program.

For decryption, as shown in a flow chart of FIG. 4A the cipher processing program 10 reads out the obtained encrypted copyright digital information ED1$i$ through the main data bus 22 from the option hardware 6 or the FDD unit 3 and deciphers it using the decryption key K1 obtained from the separate copyright control center and inputted in the cipher processing program 10 from the CPU 1, so that the deciphered digital information is stored in the main storage RAM 8 after passing through the main data bus 22.

Figure 4B:
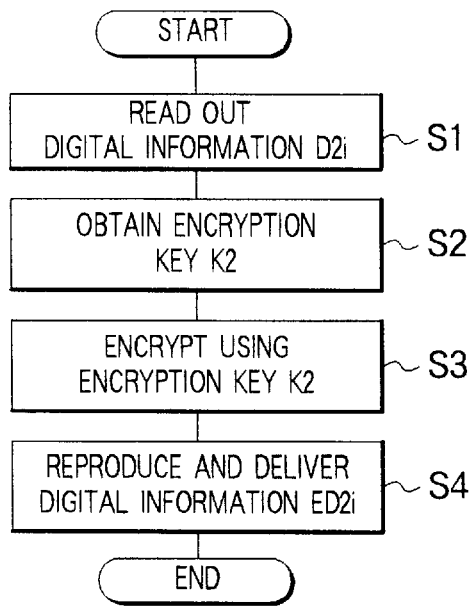

On the other hand, for encryption, as shown in a flow chart of FIG. 4B the cipher processing program 10 reads out, through the main data bus 22, the displayed, edited and processed copyright digital information D2$i$ in the main storage RAM 8 and enciphers it using the encryption key K2 obtained from the separate copyright control center and inputted from the CPU 1 into the cipher processing program 10, thus producing the encrypted digital information ED2$i$. Further, the cipher processing program 10 reproduces and delivers the encrypted digital information ED2$i$ through the main data bus 22 from the HDD unit 2, the FDD 3 or the interface 5 for connections to external networks.

Fourth Embodiment

This fourth embodiment relates to a more concrete arrangement of an encryption/decryption hardware 11.

Figure 5:
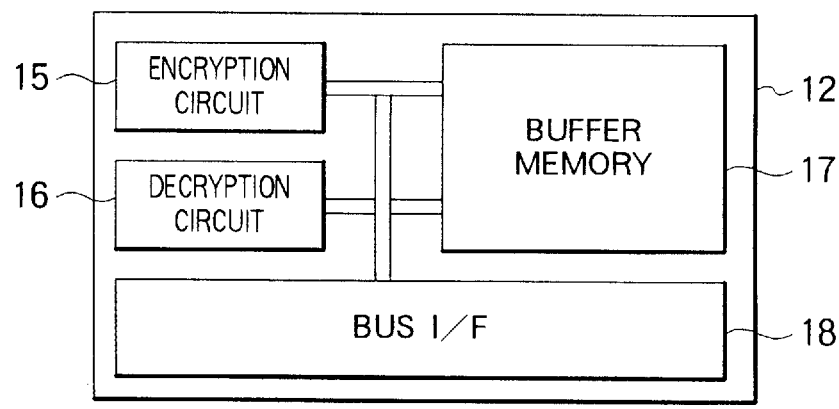
FIG. 5 is a block diagram showing an encryption/decryption hardware according to a fourth embodiment of this invention.

FIG. 5 is an illustration of an encryption/decryption LSI in the case that the encryption/decryption processing hardware 11 in the first or second embodiment is constructed with an LSI. In FIG. 5, a copyright control system is shown as including an encryption/decryption processing LSI 12, an encryption circuit 15, a decryption circuit 16, a buffer memory 17, and a bus interface 18 for connection to a main data bus or a sub-data bus 23.

Furthermore, a description will be made in terms of an example where the encryption/decryption processing LSI 12 of FIG. 5 is applied to the encryption/decryption hardware 11 of the first embodiment.

The obtained encrypted copyright digital information ED1$i$ is read out through the sub-data bus 23 from the option hardware 6 or the FDD unit 3 and then stored in the buffer memory 17 of the encryption/decryption processing LSI 12 through the bus interface 18. Subsequently, the decryption circuit 16 reads out the encrypted digital information ED1$i$ from the buffer memory 17 and deciphers it using the decryption key K1 obtained from the separate copyright control center and inputted from the CPU 1 into the encryption/decryption processing LSI 12, before making the deciphered data again stored in the buffer memory 17. The digital information deciphered and returned to a plain text D1$i$ is sent through the bus interface 18 to the main data bus 22 to be stored in the main storage RAM 8.

Moreover, a description will be taken of the encryption processing of the edited and processed copyright digital information.

The copyright digital information D2$i$, being displayed, edited and processed by the CPU 1 or the like and stored in the main storage RAM 8, is read out through the main data bus 22 and stored in the buffer memory 17 through the bus interface 18. The encryption circuit 15 enciphers the copyright digital information D2$i$, read out from the buffer memory 17 in a plain text form, by means of the encryption key K2 obtained from the separate copyright control center and inputted from the CPU 1 into the encryption/decryption processing LSI 12, thereby creating the encrypted digital information ED2$i$. This encrypted digital information ED2$i$ is again stored in the buffer memory 17 by the encryption circuit 15. In addition, the encrypted digital information ED2$i$, converted into a ciphered text, is transferred through the bus interface 18 to the sub-data bus 23. The encrypted copyright digital information ED2$i$ delivered to the sub-data bus 23 is reproduced and delivered from the HDD unit 2, the FDD unit 3 or the interface 5 for connections to external networks.

Fifth Embodiment

Although in the fourth embodiment the encryption/decryption LSI is used as the encryption/decryption hardware 11 in the first or second embodiment, it is also appropriate to realize it with an extended board.

Figure 6:
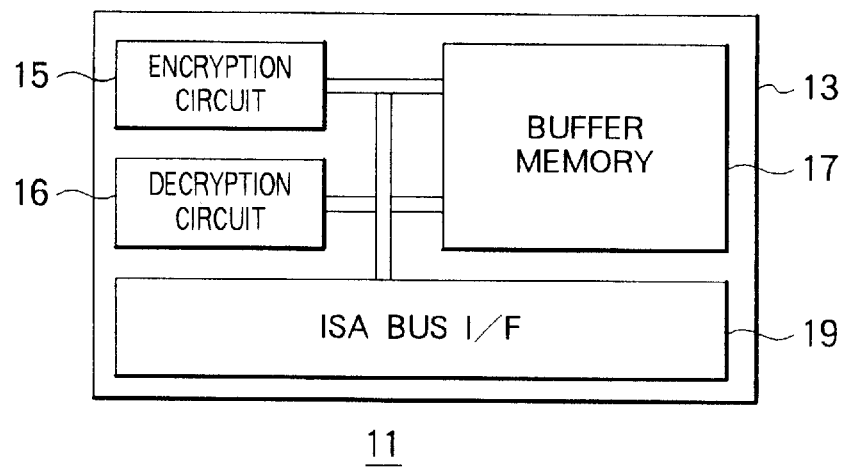
FIG. 6 is a block diagram showing an encryption/decryption hardware according to a fifth embodiment of this invention.

FIG. 6 is an illustration of an encryption/decryption processing extended board in which the encryption/decryption hardware 11 of the first or second embodiment is constructed with an extended board. In FIG. 6, numeral 13 represents an encryption/decryption processing extended board and numeral 19 denotes an ISA bus interface.

The encryption/decryption processing extended board 13 performs the data input and output from and to other units through the ISA bus interface 19. In this respect, this embodiment differs from the above-mentioned fourth embodiment. The other portions are similar in operation to those of the fourth embodiment.

Sixth Embodiment

Figure 7:
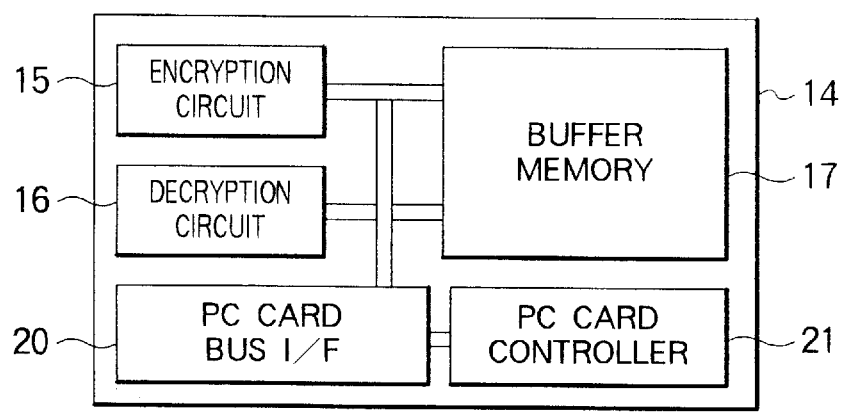
FIG. 7 is a block diagram showing an encryption/decryption hardware according to a sixth embodiment of this invention.
Figure 8:
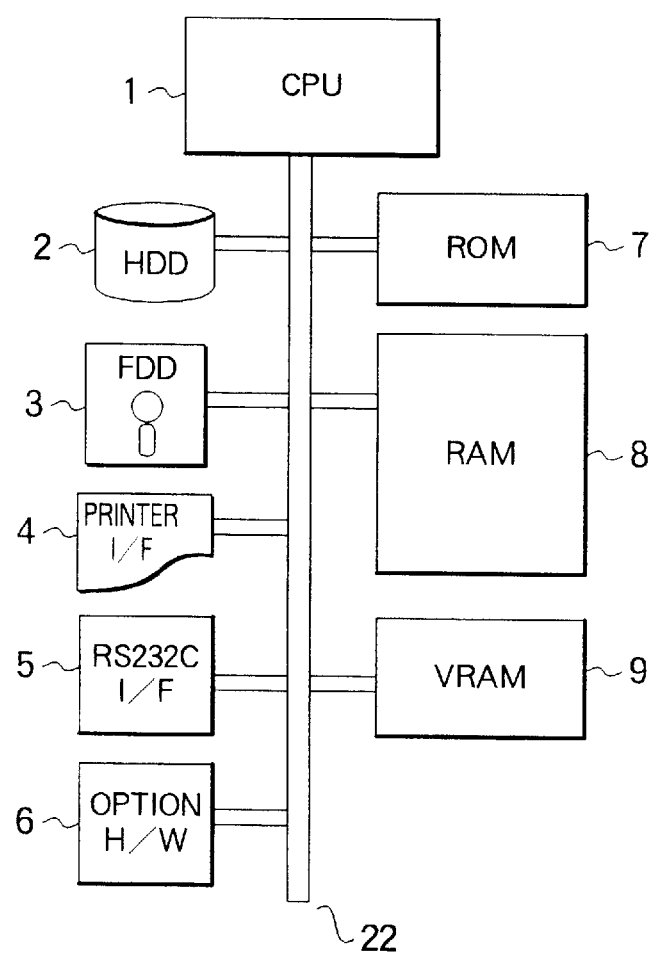
FIG. 8 is a block diagram showing a prior general computer.

The encryption/decryption hardware 11 in the first or second embodiment can also be realized with an encryption/decryption processing PC card using a PCMCIA card, an IC card or the like. FIG. 7 is an illustration of an arrangement of an encryption/decryption processing PC card. In FIG. 7, numeral 14 denotes an encryption/decryption processing PC card, numeral 20 signifies a PC card bus interface, and numeral 21 indicates a PC card controller.

The encryption/decryption processing PC card 14 performs the data input and output from and to the other units through the PC card bus interface 20 and the PC card controller 21, which is different from the fourth embodiment. The other arrangement is similar in operation to the fourth embodiment.

Seventh Embodiment

Although in the encryption/decryption processing extended board 13 of the fifth embodiment the encryption circuit 15, the decryption circuit 16 and the buffer memory 17 are individually provided, the encryption/decryption processing LSI can be used in place of the encryption circuit 15, the decryption circuit 16 and the buffer memory 17, which exhibits the same effects.

Eighth Embodiment

Although in the encryption/decryption processing PC card 14 of the sixth embodiment the encryption circuit 15, the decryption circuit 16 and the buffer memory 17 are separately situated, the encryption/decryption processing LSI 12 can be used in place of the encryption circuit 15, the decryption circuit 16 and the buffer memory 17. This arrangement can also offer the same effects.

Ninth Embodiment

Although in the encryption/decryption processing LSI 12 the bus interface 18 is placed in common with respect to the main data bus 22 and the sub-data bus 22, it is also possible to separately provide a bus interface connected to the main data bus 22 and a bus interface coupled to the sub-data bus 23. In this case, the encryption/decryption processing LSI 12 demonstrates the same effect.

As described above, according to this invention, an access to the encrypted copyright digital information ED1$i$ is possible only when the copyright control system deciphers it using the decryption key K1, and hence it is impossible to use the copyright digital information without permission.

In addition, the displayed, edited and processed copyright digital information D2$i$ can be transferred, reproduced and stored only after the re-encryption by the encryption key K2, and therefore it is possible to prevent the use of the illegally transferred, reproduced and stored digital information.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A copyright control system, comprising:

decryption means which accepts encrypted copyright digital information and decrypts said encrypted digital information using a decryption key obtained from a copyright control center for primary utilization of said encrypted digital information; and encryption means for accepting decryoted copyright digital information from said decryption means and encrypting said digital information using an encryption key obtained from a copyright control center for secondary utilization of said digital information.

2. The copyright control system according to claim 1, further comprising:

first information processing means to implement at least one of display, process and edit of said digital information decrypted by said decryption means.

3. The copyright control system according to claim 1, further comprising:

a second information processing means to perform at least one of communication, broadcast, storage and copy of said digital information encrypted by said encryption means.

4. The copyright control system according to claim 1, further comprising:

central information processing unit and a main data bus directly connected to said central information processing unit, said decryption means being coupled to said main data bus.

5. A copyright control system comprising:

a central information processing unit;

a main data bus directly connected to said central information processing unit;

an auxiliary memory;

network connection unit;

a sub-data bus coupled to said auxiliary memory and said network connection unit;

decryption means which accepts encrypted copyright digital information and decrypts said encrypted digital information using a decryption key obtained from a copyright control center for primary utilization of said encrypted digital information; and encryption means for accepting decrypted copyright digital information from said decryption means and encrypting said digital information using an encryption key obtained from a copyright control center for secondary utilization of said digital information, said decryption means being coupled to said sub-data bus said decryption means also being coupled to said sub-data bus and interposed between said main data bus and said sub-data bus to provide a gateway between said central information processing unit and said auxiliary memory and between central information processing unit and said network connection.

6. The copyright control system according to claim 1, wherein said decryption means and said encryption means are incorporated in an LSI.

7. The copyright control system according to claim 1, wherein said decryption means and said encryption means are incorporated in an extended board.

8. The copyright control system according to claim 1, wherein said decryption means and said encryption means are provided in a PC card.

9. The copyright control system according to claim 1, further comprising a central information processing unit and a main data bus directly connected to said central information processing unit, said encryption means being coupled to said main data bus.

10. The copyright control system according to claim 9, further comprising an auxiliary memory, a network connection unit and a sub-data bus coupled to said auxiliary memory and said network connection unit, said encryption means being coupled to said sub-data bus and interposed between said main data bus and said sub-data bus to provide a gateway between said central information processing unit and said auxiliary memory and between central information processing unit and said network connection.

11. The copyright control system according to claim 5, wherein said encryption means and said decryption means are incorporated in an LSI.

12. The copyright control system according to claim 5, wherein said encryption means and said decryption means are incorporated in an extended board.

13. The copyright control system according to claim 5, wherein said encryption means and said decryption means are provided in a PC card.

14. A method of controlling primary and secondary copyrights, comprising the steps of:

obtaining a decryption key from a copyright control center for primary utilization of copyrighted digital information;

receiving encrypted copyrighted digital information;

decrypting the encrypted digital information using the decryption key obtained from the copyright control center for primary utilization of said encrypted digital information;

storing the decrypted digital information decrypted by said decrypting step;

obtaining an encryption key from the copyright control center for secondary utilization of copyrighted digital information; and encrypting the stored digital information using the encryption key obtained from the copyright control center for secondary utilization of said digital information.

15. The method of controlling primary and secondary copyrights according to claim 14, further comprising the steps of:

displaying, processing or editing the decrypted digital information decrypted by said decrypting step.

16. The method of controlling primary and secondary copyrights according to claim 14, further comprising the steps of:

communicating, broadcasting, storing or copying the digital information encrypted by said encrypting step.

* * * * *

UNITED STATES PATENT AND TRADEMARK OFFICE
CERTIFICATE OF CORRECTION

PATENT NO : 5,818,933
DATED : October 6, 1998
INVENTOR(S): Kambe et al.

It is certified that error appears in the above-identified patent and that said Letters Patent is hereby corrected as shown below: On the title page: Item

[73] Assignee: Mitsubishi Denki Kabushiki Kaisha and

Mitsubishi Corporation, both of Tokyo, Japan

Signed and Sealed this

Thirteenth Day of March, 2001

Attest:

NICHOLAS P. GODICI

Attesting Officer

Acting Director of the United States Patent and Trademark Office